United States Patent [19]

Ogura

[11] Patent Number: 4,527,461
[45] Date of Patent: Jul. 9, 1985

[54] ROTATING SERVOMOTOR APPARATUS

[75] Inventor: Kunio Ogura, Yokohama, Japan

[73] Assignee: Tokyo Shibaura Denki Kabushiki Kaisha, Kawasaki, Japan

[21] Appl. No.: 611,927

[22] Filed: May 22, 1984

Related U.S. Application Data

[63] Continuation of Ser. No. 329,587, Dec. 10, 1981, abandoned.

[30] Foreign Application Priority Data

Dec. 18, 1980 [JP] Japan .................. 55-179200

[51] Int. Cl.³ .................. F15B 13/04; F16K 3/24
[52] U.S. Cl. .................. 91/519; 91/464; 91/466; 92/122; 137/625.69
[58] Field of Search .................. 91/375 A, 418, 466, 91/464, 519; 137/625.67, 625.69; 92/122

[56] References Cited

U.S. PATENT DOCUMENTS

| | | | |
|---|---|---|---|
| 3,062,192 | 11/1962 | Webb .................. | 91/464 |
| 3,195,570 | 7/1965 | Runkle .................. | 91/464 |
| 3,563,272 | 2/1971 | Mercier .................. | 137/625.69 |
| 3,773,081 | 11/1973 | Venable et al. .................. | 91/375 A |
| 4,022,425 | 5/1977 | Govzman et al. .................. | 137/625.69 |
| 4,155,535 | 5/1979 | Seamone .................. | 137/625.69 |

Primary Examiner—Deborah L. Kyle
Assistant Examiner—Richard Klein
Attorney, Agent, or Firm—Oblon, Fisher, Spivak, McClelland & Maier

[57] ABSTRACT

A rotating servomotor apparatus for use in rotating guide vanes in a hydraulic machine, wherein for the purpose of suppressing occurrence of flow-induced vibrations, there is provided a bearing to support wicket gates, a rotating servomotor which includes a movable spindle projecting in the axial direction and which has a plurality of movable partition members, a cylinder having a plurality of stationary partition members disposed around the spindle, and a plurality of compartments partitioned between the movable partition members and the stationary partition members; and a first distributing valve connected to one side of plural compartments within the cylinder of the rotating servomotor means, a second distributing valve connected to the other side of plural compartments within the cylinder of the rotating servomotor means, wherein the respective distributing valves have valve piston members sized and arrangeable with respect to fluid inlets and outlets to define a neutral position in which fluid is supplied only into selected of plural compartments and is drained only from the non-selected compartments to exert continuously a balanced pressure against the movable spindle.

6 Claims, 4 Drawing Figures

ROTATING SERVOMOTOR APPARATUS

This application is a continuation of application Ser. No. 329,587, filed Dec. 10, 1981 now abandoned.

BACKGROUND OF THE INVENTION

1. Field of the Invention

This invention generally relates to a rotating servomotor apparatus for use in a hydraulic machine and more particularly to a driving apparatus to rotate wicket gates for controlling water flow.

2. Description of the Prior Art

In general, a rotating servomotor apparatus of this type, as shown in FIG. 1 is attached to a spindle 3 provided with wicket gates 2 and functions to control the openings of the wicket gates 2 or to maintain a constant degree of opening of the wicket gates or guide vanes. As shown in FIG. 2, stationary partition members 5 extend radially inwardly from a servo-cylinder 4 of a rotating servomotor 1 and partition a plurality of compartments 7a, 7b . . . 7h in cooperation with movable partition members 6 disposed on a spindle 3.

The stationary position members 5 disposed on the servo-cylinder 4 consist of four equally spaced partitions arranged at 90° intervals. Four movable partition members 6 corresponding to the number of stationary partition members 5 also are provided, so that within the rotating servo-cylinder 4 are formed eight compartments 7a, 7b . . . 7h. Openings 8a, 8b . . . 8h corresponding to the above-described respective compartments are provided through respective portions of the circumferential wall of the rotating servo-cylinder 4.

Also shown schematically in FIG. 2 are passages 12a and 12b having respective ends connected to fluid-supply openings 11a and 11b disposed on a distributing valve 10 which has a valve piston 9 inserted therein. The other end of passage 12a is connected to the openings 8a, 8c, 8e and 8g of the rotating servo-cylinder 4, and the other end of passage 12b is connected to the openings 8b, 8d, 8f, and 8h of the rotating servo-cylinder 4. The openings 8a, 8b . . . 8h are alternately connected in the circumferential direction to the fluid-supply openings 11a and 11b of a distributing valve 10. Further, the distributing valve 10 is provided with an inlet passage (solid line) to receive fluid from a fluid-supply port (not shown), and outlet passages (dotted line) to drain fluid from the servomotor 1.

When the valve piston 9 is actuated upwardly, for example, fluid such as oil under pressure is supplied from the distributing valve 10 into the compartments 7a, 7c, 7e and 7g which are partitioned by the movable partition members 6 and the stationary partition members 5. The movable partition members 6 are then rotated to cause the wicket gates to be opened, and when the wicket gates are to be closed, the reverse operations are made.

When the valve piston 9 is positioned in a neutral position, the wicket gates 2 are caused to maintain a constant degree of opening. The relationship between the opening degree of wicket gates and the hydraulic moment developed at the wicket gate spindle, as shown in FIG. 3, illustrates that when such hydraulic moment reaches near zero, the wicket gates are in equilibrium.

Therefore, the rotating servomotors of the above-described type are susceptible to accurrence of flow-induced vibrations at the wicket gates, and this causes the occurrence of noises or even damage of various members in hydraulic machines.

SUMMARY OF THE INVENTION

Accordingly, one object of this invention is to provide a new and improved rotating servomotor apparatus capable of constraining its spindle when in equilibrium.

Briefly, in accordance with one aspect of this invention, a rotating servomotor apparatus is provided which includes a rotating servomotor including, a rotatable spindle having a plurality of partition members, and a cylinder means having a plurality of stationary partition members disposed around the spindle, the rotating servomotor having a plurality of compartments partitioned between the spindle partition members and the stationary partition members; distributing valve means for supplying fluid to the compartments and for draining fluid from the compartments including, a first distributing valve connected to one side of the plural compartments within the cylinder of the rotating servomotor, and a second distributing valve connected to the other side of the plural compartments, the first and the second distributing valves including piston means for controlling the supplying and draining of fluid to and from the compartments, the piston means having a neutral position in which fluid is supplied only into selected of plural compartments and in which fluid is drained only from the non-selected of the plural compartments located radially opposite a respective of the selected compartments to exert continuously a balanced rotational pressure and an unbalanced translational pressure against the rotatable spindle.

BRIEF DECRIPTION OF THE DRAWINGS

A more complete appreciation of the invention and many of the attendant advantages thereof will be readily obtained as the same become better understood by reference to the following detailed description when considered in connection with the accompanying drawings wherein.

DESCRIPTION OF THE PREFERRED EMBODIMENTS

Figure 1:
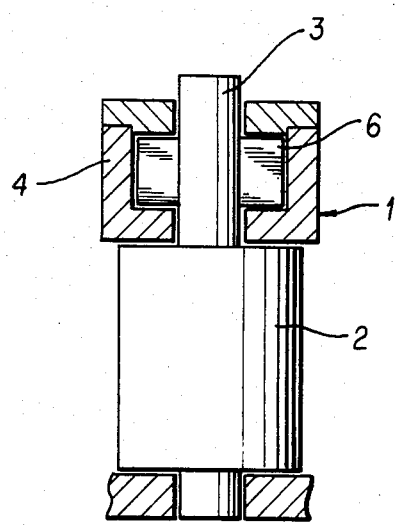
FIG. 1 is a cross-sectional view illustrating a conventional rotating servomotor attached to a spindle of wicket gates.
Figure 2:
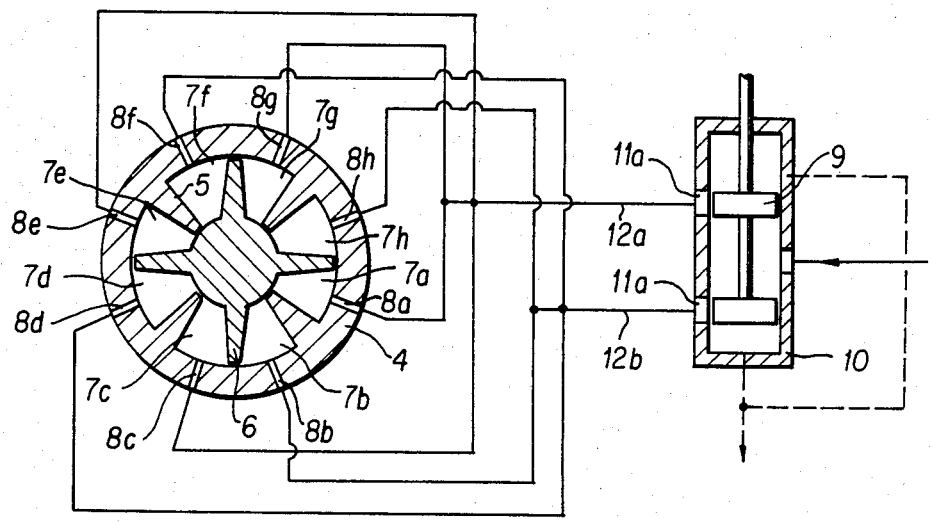
FIG. 2 is a schematic diagram partially in cross-section illustrating a control mechanism of the conventional rotating servomotor shown in FIG. 1.
Figure 3:
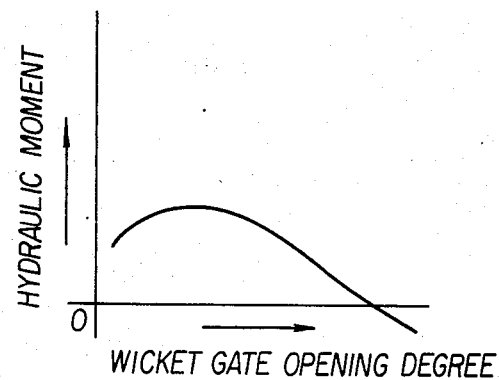
FIG. 3 is a graph of the relationship between hydraulic moment and the opening degrees of wicket gates.
Figure 4:
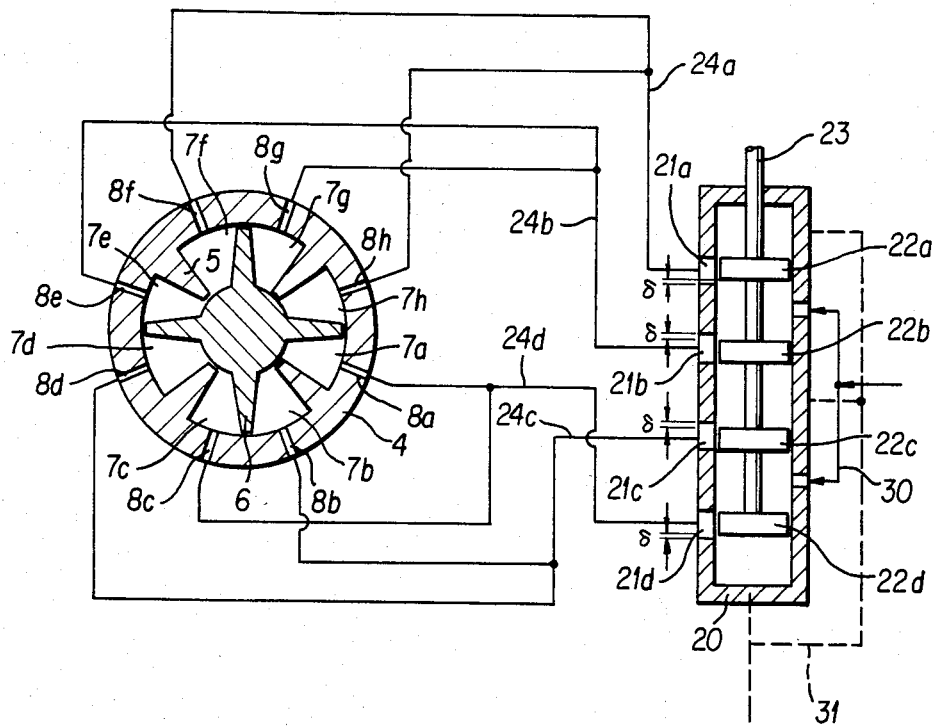
FIG. 4 is a schematic diagram partially in cross-section illustrating one embodiment of a rotating servomotor according to the present invention.

Referring now to the drawings, wherein like reference numerals designate identical or corresponding parts throughout the several views, and more particularly to FIG. 4 thereof, reference numeral 20 designates a distributing valve, which is provided with four oil-supply openings 21a, 21b, 21c and 21d to which passages of two systems are connected. Passages 30 (solid lines) are so arranged as to communicate with a fluid-supply port such as pressure oil-supply port (not shown), and passages 31 (dotted lines) are so arranged as to drain fluid from the distributing valve 20. The distributing valve 20 has a valve piston 23 inserted therein. Valve piston 23 is provided with disk-shaped valve members 22a, 22b, 22c and 22d corresponding respectively to the oil-supply openings 21a, 21b, 21c and 21d. The valve piston 23 is connected to a driving apparatus such as a pilot valve (not shown) which functions in response to operating signals. The thickness of the disk-shaped valve members 22a, 22b, 22c and 22d is so designed as to be smaller than corresponding openings 21a, 21b, 21c and 21d to establish clearances δ(delta).

On the other hand, the connections between the openings 21a through 21d of the distributing valve 20 to openings 8a through 8h of the rotating servo-cylinder 4 are made such that the opening 21a is conneced through passages 24a to the openings 8f and 8h, and then 21b through 24b to 8e and 8g, and 21c through 24c to 8b and 8d, and 21d through 24d to 8a and 8c, respectively.

Nextly describing the operation of the rotating servomotor 1, and assuming that, in FIG. 4, when the valve piston 23 is actuated upwardly in accordance with the pilot valve (not shown), the oil under pressure supplied from the pressure oil-supply port is supplied from the oil-supply openings 21a and 21c through the passages 24a and 24c to the rotating servo-cylinder 4 and is admitted into its compartments 7f, 7h, 7b and 7d. Simultaneously, the pressure oil within the compartments 7e, 7g, 7a and 7c of the rotating servo-cylinder 4 is drained from the passages 24b and 24d through the oil-supply openings 21b and 21d into the passages 32 of the distributing valve 20. As a result, the spindle 3, as in FIG. 4, rotates clockwise and causes the wicket gates 2 to open. When the wicket gates 2 are to be closed, the downward movement of the valve piston 23 performs the reverse of the above-described operation, and the detailed description is omitted.

Nextly, the operations to constrain firmly the spindle of a rotating servomotor are described. In order to maintain a constant opening of the wicket gates 2, the valve piston 23 is positioned to a valve piston neutral position such that the valve members 22a, 22b, 22c and 22d disposed on the valve piston 23 should coincide with the oil-supply openings 21a, 21b, 21c and 21d of the distributing valve 20. However, in this case, since clearances δ are established between the valve members 22a, 22b, 22c and 22d of the valve piston 23 and the oil-supply openings 21a, 21b, 21c and 21d of the distributing valve 20, the oil under pressure, in passages of one of the systems, is supplied from the clearance δ through the openings 8e, 8f, 8g and 8h into the compartments 7e, 7f, 7g and 7h, while in the passages of the other system, the oil under pressure is drained from the openings 8a, 8b, 8c and 8d of the compartments 7a, 7b, 7c and 7d through the clearances δ.

Consequently, under a condition that the openings of the wicket gates be maintained constant, unbalanced translational pressure is created perpendicular to the axis of the spindle 3 and is continuously exerted thereupon.

Therefore, friction is produced between the wicket gate spindle 3 and the servo-cylinder or bearings, and this constrains the wicket gates, so that vibrations caused by water flow are effectively suppressed.

As described above, in accordance with the present invention, when the openings of wicket gates are maintained constant, the forces created in a normal direction against the wicket gate spindle are exerted thereupon, providing mechanical damping between the spindle and servo-cylinder or bearinbs to minimize occurrence of vibrations caused by water flow around the wicket gates, so that anticipated troubles of various types are effectively prevented.

Moreover, upon opening of the wicket gates, the rotating servomotor comes into a well-balanced condition, so that friction between the spindle and bearings are extremely minimized.

Furthermore, it will be understood that while the above-described embodiment of the present invention is disclosed as a two fluid passage system, the system need not be so limited; that although the distributing valve is described having four valve members, it may be implemented by a pair of conventional dual valve-type-members linked in operation; that the disclosed apparatus may be applied not only to rotate the wicket gate but also to hold firmly other members attached to the servomotor spindle; and that besides use in rotating the wicket gates of hydraulic machines, the disclosed apparatus may also be applied to drive the runner impellers of an oblique flow type movable propeller water turbine, the so called Deriaz turbine.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotating servomotor apparatus comprising:
a rotating servomotor including,
a rotatable spindle having a plurality of partition members, and
a cylinder having a plurality of stationary partition members disposed around said spindle,
said rotating servomotor having a plurality of compartments partitioned radially between said spindle partition members and said stationary partition members;
distributing valve means for supplying fluid to said compartments and for draining fluid from said compartments, including
a first distributing valve connected to one side of said plural compartments within said cylinder of said rotating servomotor, and
a second distributing valve connected to the other side of said plural compartments,
said first and second distributing valves including piston means for controlling the supplying and draining of fluid to and from said compartments, said piston means having a neutral position in which fluid is supplied only into selected of plural compartments and in which fluid is drained only from the non-selected of said compartments located radially opposite a respective of the selected compartments to exert continuously a balanced rotational pressure and an unbalanced translational pressure against said rotatable spindle.

2. A rotating servomotor apparatus as recited in claim 1, wherein said first and second distributing valves includes valve piston members and openings opposing thereto, said valve piston members having smaller opposing areas compared to that of said openings.

3. A rotating servomotor apparatus as recited in claim 2, further comprising:
said distributing valve means having a plurality of inlets to receive fluid supply, and a plurality of outlets to drain the fluid therefrom, said first distributing valve arranged so that the fluid-receiving inlets thereof communicate with said one side of said plural compartments, and said second distributing valve arranged so that said fluid-drainage outlets communicate with said other side of said plural compartments.

4. A rotating servomotor apparatus as recited in claim 1, wherein said first and second distributing valves are cooperatively connected.

5. A hydraulic machine comprising:

plural wicket gates;

a bearing for supporting said wicket gates;

a rotating servomotor for adjusting the positioning of said wicket gates, including, a rotatable spindle projecting axially and having a plurality of movable partition members, a cylinder having a plurality of stationary partition members disposed around said spindle, and a plurality of compartments partitioned radially between said movable partition members and said stationary partition members, and a distributing valve means for controlling the supplying and draining of a fluid to and from said compartments, including a first distributing valve connected to one side of plural compartments within said cylinder of said rotating servomotor, p1 a second distributing valve connected to the other side of plural compartments within said cylinder of said rotating servomotor, and said first and said second distributing valves including piston means for controlling the supply and draining of said fluid, said piston means having a neutral position in which fluid is supplied only into selected of plural compartments and in which fluid is drained only from the non-selected of said compartments located radially opposite a respective of the selected compartments to exert continuously a balanced rotational pressure and an unbalanced translational pressure against said rotatable spindle.

6. A hydraulic machine apparatus as recited in claim 5, wherein said first and second distributing valves are cooperatively connected.

* * * * *